(12) United States Patent
Younge et al.

(10) Patent No.: US 11,664,923 B2
(45) Date of Patent: May 30, 2023

(54) OPTIMIZING USE OF EXISTING TELECOMMUNICATION INFRASTRUCTURE FOR WIRELESS CONNECTIVITY

(71) Applicant: T-Mobile USA, Inc., Bellevue, WA (US)

(72) Inventors: Mark Younge, Golden, CO (US); Jean Trakinat, Ewa Beach, HI (US); Scott Francis Migaldi, Cary, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 24 days.

(21) Appl. No.: 17/318,275

(22) Filed: May 12, 2021

(65) Prior Publication Data

US 2022/0368408 A1 Nov. 17, 2022

(51) Int. Cl.
| | | |
|---|---|---|
| *H04L 1/00* | (2006.01) | |
| *H04B 7/155* | (2006.01) | |
| *H04W 92/00* | (2009.01) | |
| *H04B 17/318* | (2015.01) | |
| *H04B 10/2575* | (2013.01) | |

(52) U.S. Cl.
CPC ....... *H04L 1/0003* (2013.01); *H04B 7/15528* (2013.01); *H04B 10/25752* (2013.01); *H04B 17/318* (2015.01); *H04W 92/00* (2013.01)

(58) Field of Classification Search
None
See application file for complete search history.

(56) References Cited

U.S. PATENT DOCUMENTS

| | | | | |
|---|---|---|---|---|
| 6,208,637 | B1* | 3/2001 | Eames | ................ H04L 12/2801 709/227 |
| 6,229,818 | B1* | 5/2001 | Bell | ..................... H04M 11/062 370/465 |
| 6,282,189 | B1* | 8/2001 | Eames | ................ H04L 12/5601 370/352 |
| 6,317,884 | B1* | 11/2001 | Eames | ............ H04N 21/42221 725/74 |
| 6,490,328 | B1* | 12/2002 | Wu | ................... H04L 25/03885 375/232 |
| 6,493,875 | B1* | 12/2002 | Eames | ................ H04L 65/1036 725/74 |
| 6,633,545 | B1* | 10/2003 | Milbrandt | ............ H04L 5/1446 370/465 |
| 6,700,927 | B1* | 3/2004 | Esliger | ................ H04L 27/2608 375/222 |
| 6,937,663 | B2 | 8/2005 | Jett et al. | |
| 8,571,149 | B2 | 10/2013 | Shi et al. | |
| 9,781,453 | B2 | 10/2017 | Rakib | |

(Continued)

Primary Examiner — Gennadiy Tsvey
(74) Attorney, Agent, or Firm — Han Santos, PLLC

(57) ABSTRACT

This disclosure describes techniques that enable a Radio Frequency (RF) signal controller and optional digital signal translator to use the existing telecommunication infrastructure of a business or residential establishment to deliver wireless communication services to the business or residential establishment. The data signal controller may transceive a first data signal via a first signal interface, determine if/how to process the first data signal to generate a second data signal that is suitable to be transported into the establishment via legacy telecommunications infrastructure.

20 Claims, 7 Drawing Sheets

(56) References Cited

U.S. PATENT DOCUMENTS

| | | | | |
|---|---|---|---|---|
| 2003/0107999 | A1* | 6/2003 | Peleg | H04L 12/5602 |
| | | | | 370/252 |
| 2005/0147158 | A1* | 7/2005 | Bremer | H04M 11/062 |
| | | | | 375/222 |
| 2008/0069006 | A1* | 3/2008 | Walter | H04L 43/0894 |
| | | | | 370/465 |
| 2008/0095188 | A1* | 4/2008 | Remy | H04L 47/25 |
| | | | | 370/468 |
| 2010/0073063 | A1* | 3/2010 | Lakshmikumar | H04L 25/0264 |
| | | | | 327/309 |
| 2011/0188439 | A1* | 8/2011 | Mao | H04L 67/303 |
| | | | | 370/312 |
| 2011/0299412 | A1* | 12/2011 | Diab | G05B 15/02 |
| | | | | 370/252 |
| 2013/0117377 | A1* | 5/2013 | Miller | A63F 13/35 |
| | | | | 709/205 |
| 2014/0359153 | A1* | 12/2014 | Heng | H04L 65/65 |
| | | | | 709/231 |
| 2018/0342997 | A1* | 11/2018 | Maeda | H03G 3/3036 |
| 2022/0060347 | A1* | 2/2022 | Sevindik | H04W 28/06 |

* cited by examiner

OPTIMIZING USE OF EXISTING TELECOMMUNICATION INFRASTRUCTURE FOR WIRELESS CONNECTIVITY

BACKGROUND

As electronic devices become more sophisticated, consumers are relying on more wireless communication services to perform day-to-day tasks. To support the ever-increasing demand, telecommunication service providers continue to develop wireless infrastructure capable of providing telecommunication services to consumers across a growing geographic expanse. Service providers rely primarily on strategically placed base-station nodes to expand service coverage. Often, the quality of service (QoS) attributed to telecommunication services, such as 5G-New Radio (5G-NR) or Long-Term Evolution (LTE), can be attributed to, in part, the relative location of a subscriber device to a base station node. If the subscriber device is proximate to or within line-of-sight of the base station node, the QoS may reach or exceed an acceptable QoS threshold. If, however, the line-of-sight between a subscriber device and a base station node is obstructed, or if the subscriber device is located at too great a distance from the base station node, signal attenuation may cause the QoS of telecommunication services to fall below an acceptable QoS threshold.

As telecommunication service providers expand their service offerings to providing fixed wireless services to business and residential establishments and utilize short-wavelength frequency bands the QoS of telecommunication services may be limited by radio signal attenuation through building infrastructure. Consequently, some telecommunication service providers offer window-mounted or wall-mounted repeaters to help propagate Radio Frequency (RF) signals through building infrastructure, thereby improving signal strength inside the building. While inside window-mounted and wall-mounted repeaters may help to achieve an acceptable QoS, such devices are considered unsightly and may be difficult or impossible to place properly indoors, thereby limiting commercial adoption.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
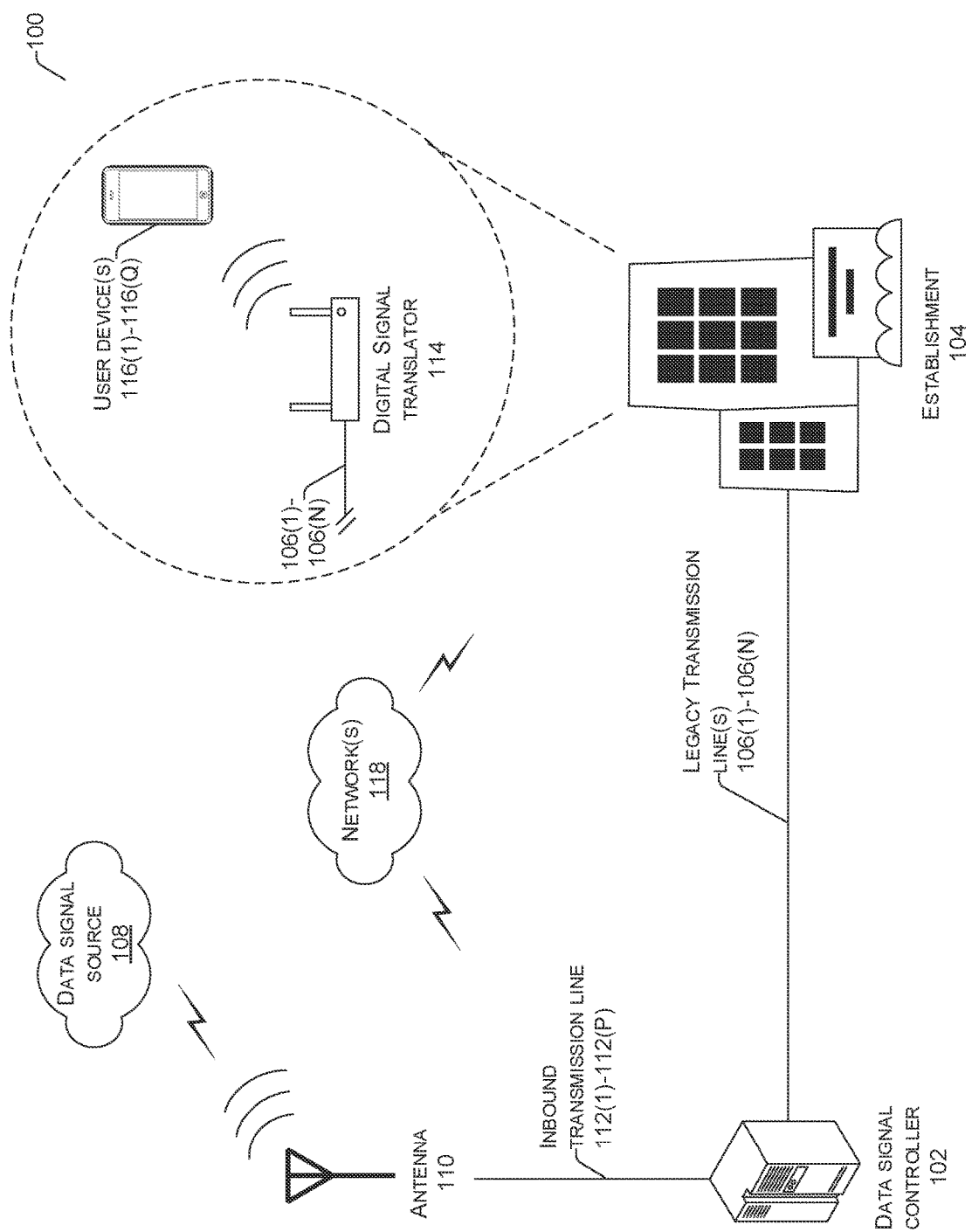
FIG. 1 illustrates an example computing environment that facilitates the operation of a data signal controller.

This disclosure describes techniques that enable the delivery of wireless communication services to a commercial or non-commercial business, residential dwelling, or any other establishment (collectively hereinafter, "establishment") that sends and receives data signals via a legacy telecommunications infrastructure. The legacy telecommunications infrastructure may include, without limitation an exact, similar, or different air interface, existing terrestrial television antennas, existing satellite TV antennas, existing twin-lead and coax cables, existing twisted-pair telephone cables, and existing AC power wiring. A data signal controller is described that may receive an inbound data signal from a telecommunication service provider. The data signal controller may analyze the inbound data signal, and in doing so, deliver an outbound data signal to the establishment using legacy telecommunication infrastructure. The outbound data signal may be the same signal type as the inbound data signal. For example, the data signal controller may repeat an inbound 5G-NR signal, and in doing so, deliver an outbound 5G-NR signal to the establishment via legacy telecommunication infrastructure. Alternatively, the data signal controller may process an inbound data signal to generate and deliver a different outbound data signal for transport over the legacy telecommunication infrastructure to the establishment. For example, consider the data signal controller receiving an inbound 5G-NR signal. The data signal controller may determine that the legacy telecommunication infrastructure is incapable of delivering the 5G-NR signal and in doing so, detect, re-modulate, and/or translate the 5G-NR signal to generate and deliver a different outbound data signal, such as a WiFi signal.

The data signal controller may comprise an inbound data signal interface that is configured to receive the inbound data signal. The inbound data signal interface may capture unguided RF signals via an antenna or guided data signals via an inbound transmission line. Alternatively, or additionally, the inbound data signal interface may provide a communicative interface for an inbound transmission line to receive a guided inbound data signal (e.g., a guided inbound RF signal or a guided inbound light signal). The inbound transmission line may be a coaxial or twin-lead cable or a twisted pair cable or AC power wiring that delivers guided RF signals, or a fiber optic cable that delivers data signals via light rather than electricity.

Similarly, the data signal controller may comprise an outbound data signal interface that provides an interface for legacy transmission lines that are configured to carry guided data signals to an establishment. The legacy transmission lines may comprise coaxial cables, twin-lead cables, twisted pair cables, fiber optic cables, power wiring, or any suitable combination thereof.

The data signal controller may determine the data signal capability of legacy transmission lines. Data signal capability may include data throughput, and data signal type (e.g., RF signal or light signal). For example, fiber optic cables may be capable of supporting light signals. Coaxial cables may be capable of supporting RF bandwidths up to 2 GHz with medium and low electromagnetic interference (EMI) susceptibility (e.g., RG6, Thinnet, and Thicknet coaxial cables). Twisted-pair cables may comprise shielded twisted pair (STP) cables and unshielded twisted pair (UTP) cables. UTP cables may support various categories of use, from voice-only (Category 1) to 10 Gbps data throughput (Category 7). Each category of use (e.g., Categories 1 through 7) is created through the use of different rates-of-twist of wire pairs.

The data signal controller may determine whether the legacy transmission lines are capable of carrying an inbound data signal received transceived at the inbound data signal interface, or whether processing of the data signal is required. For example, if the inbound data signal has a baseband data rate of 100 Mbps, and the legacy transmission line is capable of a baseband data throughput up to 10 Mbps the data signal controller may determine that the legacy transmission lines are not able to carry the inbound data signal. The data signal controller may modulate the inbound baseband data signal to create an outbound data signal that is capable of being carried by the legacy transmission lines. In this example, signal modulation may occur based at least in part on the capability of the legacy transmission lines.

In another example, the data signal controller may analyze the RF signal strength of an inbound RF signal. If the data signal controller determines that the RF signal strength is less than a predetermined RF signal strength threshold, the data signal controller may perform acts to amplify or repeat the inbound RF signal. Here, the data signal controller may, via a low noise amplifier, amplify the inbound RF signal to create an outbound RF signal (e.g., outbound data signal) with an RF signal strength that is greater than or equal to the predetermined RF signal strength threshold. Also, the signal amplification may be based on an anticipated RF signal attenuation that is likely to occur via the legacy transmission path between the data signal controller and the establishment. For example, for a given RF signal and legacy transmission path, the data signal controller may calculate the signal attenuation that is anticipated, based on the type of legacy transmission path (e.g., air, coaxial cable, twin-lead cable unshielded twisted pair, shielded twisted pair, power wiring, fiber optic cable, etc.). In doing so, the data signal controller may amplify the initial RF signal strength of the outbound RF signal by a measure equivalent to the anticipated attenuation. Thus, the amplified outbound RF signal may deteriorate during transmission by the anticipated signal attenuation and yet be received at the establishment with an RF signal strength equivalent to the initial RF signal strength. In the case of an air transmission path, the inbound signal may be translated to another frequency to eliminate feedback from the outbound signal to the input of the data signal controller.

Moreover, the data signal controller may comprise an RF-optical modulator capable of converting an inbound RF signal to an outbound optical signal, or vice versa. For example, the data signal controller may transceive an inbound RF signal (e.g., 5G-NR signal). If the legacy transmission line between the data signal controller and the establishment comprises a fiber optic cable, the data signal controller, via the RF-optical modulator, may convert the inbound RF signal (e.g., 5G-NR signal) to an outbound optical signal capable of transmission via the fiber optic cable (e.g., legacy transmission line).

In another example, the RF-optical modulator may convert an inbound optical signal to an outbound RF signal. For example, a data signal controller may transceive an inbound optical data signal via an external fiber optic transmission line. If the legacy transmission line between the data signal controller and the establishment comprises a coaxial cable, the data signal controller may convert the inbound optical data signal to an outbound RF signal capable of transmission via the coaxial cable.

In some embodiments, the data signal controller may interact with a data signal translator that is located within the establishment. The data signal translator may be configured to analyze the data signal strength of the outbound data signal received at the establishment. In turn, the data signal translator may generate measurement data for delivery to the data signal controller that includes at least the data signal strength of the outbound data signal within the establishment. The data signal controller may use the measurement data to determine signal attenuation associated with the outbound data signal and further modulate, amplify, repeat, and/or convert an outbound data signal before delivery to the establishment.

Further, the data signal translator may monitor with the user device(s) operating within the establishment to capture their data usage. In turn, the data signal translator may generate measurement data for delivery to the data signal controller that includes the data usage. The data signal controller may analyze the data usage to determine data signal requirements associated with the user devices. Data signal requirements may include, without limitation, data signal type (e.g., RF signal or light signal), data throughput, and data latency. In other words, based on the measurement data, the data signal controller may determine whether the outbound data signal at the establishment, provides sufficient data throughput and latency to support the real-time operation of the user device(s). For example, a user device streaming real-time multimedia content may require a data throughput that is relatively higher than another user device that is streaming audio content.

The data signal translator may be configured to modulate, amplify, repeat, and/or convert outbound data signals received from the data signal controller. For example, the data signal controller may receive measurement data from the data signal translator that indicates that the data throughput or data latency of an outbound data signal is less than the data signal requirements of the user device(s) within the establishment. Based on the measurement data, the data signal controller may modulate, amplify, repeat, and/or convert the outbound data signal such that it is capable of meeting or exceeding the data signal requirements (e.g., data signal type, data throughput, data latency, or any suitable combination thereof) of the user device(s). However, in some instances, the legacy transmission lines may be unable to support the converted, modulated, and/or amplified outbound data signal. For example, if user device(s) within the establishment requires a data throughput that is greater than 10 Mbps, a legacy transmission line may be unable to carry an outbound data signal that is commensurate with the higher bandwidth (e.g., greater than 10 Mbps). In this instance, the data signal controller may instead rely on the data signal translator, located within the establishment, to modulate, amplify, and/or convert the outbound data signal. Here, the data signal controller may generate computer-executable instructions for delivery to the data signal translator that cause the data signal translator to modulate, amplify, repeat and/or convert the outbound data signal to a modified outbound data signal that is commensurate with the higher bandwidth.

In some embodiments, an establishment may include a plurality of legacy transmission lines to deliver various types of data signals. Legacy transmission lines may include, without limitation, AC power wiring, twin lead, coaxial cables, fiber optic cables, UTP cables, STP cables, or any suitable combination thereof. Here, the data signal controller may interface with each of the legacy transmission lines (e.g., via the outbound data signal interface), and in doing so, determine the data signal capability of each legacy transmission line. Thus, for a given outbound data signal, the data signal controller may select a particular legacy transmission line to transport the outbound data signal, based on the compatibility of the particular legacy transmission line in carrying a data signal type (e.g., RF signal or light signal) that corresponds to the outbound data signal, and a comparison of the data signal capability of the particular legacy transmission line (e.g., data throughput, data latency, or any suitable combination thereof) relative to the data signal characteristics (e.g., data throughput, data latency, or a suitable combination thereof) of the outbound data signal.

Additionally, the data signal controller may select a particular legacy transmission line based on the data signal requirements of the user device(s) operating within the establishment. For example, the data signal controller may interact with a data signal translator within the establishment to capture data usage of user devices operating within the establishment. In turn, the data signal controller may determine data signal requirements associated with the user device(s) operating within the establishment. In doing so, the data signal controller may select a particular legacy transmission line of the plurality of legacy transmission lines, based at least in part on the data signal requirements of the user device(s). For example, consider a user device streaming multimedia content that requires a data throughput greater than 10 Mbps. The data signal controller may modulate, amplify, repeat, and/or convert an inbound data signal to generate an outbound data signal capable of supporting a data throughput greater than 10 Mbps. Further, the data signal controller may select a particular legacy transmission line capable of transporting the outbound data signal (e.g., data throughput greater than 10 Mbps) to the establishment.

Also, the selection of a legacy transmission line may be based at least in part on the data signal type of the outbound data signal. For example, if the outbound data signal is an RF signal, the data signal controller may select a legacy transmission line capable of transporting RF signals, such as coaxial cables, UTP cables, or STP cables. Alternatively, if the outbound data signal is a light signal, the data signal controller may select a legacy transmission line capable of carrying a light signal, such as a fiber optic cable.

The term "data signal" as used throughout this disclosure is intended to collectively describe light signals transmitted through a fiber optic cable and RF signals that propagate guided through a transmission line or unguided through free space. Referring to the latter, the transmission lines capable of carrying RF signals include coaxial cables and UTP cables, STP twin-lead cables, or any other suitable equivalent.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example computing environment that facilitates the operation of a data signal controller. The computing environment 100 may comprise a data signal controller 102 that is configured to deliver an outbound data signal to an establishment 104 via legacy transmission line(s) 106(1)-106(N). The establishment 104 may be associated with a commercial or non-commercial business, a residential dwelling, or any other establishment that sends and receives data signals.

In the illustrated example, the data signal controller 102 may be configured to receive an inbound data signal from a data signal source 108 via an antenna 110. The data signal controller 102 may receive an inbound data signal from the data signal source 108 as an unguided RF signal or a guided RF signal. In one example, the data signal source 108 may comprise a base station node capable of receiving and transmitting unguided RF signals propagating in free space. Inbound RF signals may comprise 2G signals, 3G signals, LTE signals, 5G-NR signals, or any suitable combination thereof or any RF carrier(s) modulated with digital and/or analog information. In another example, the data signal controller 102 may be communicatively connected to the data signal source 108 via inbound transmission line(s) 112(1)-112(P). Accordingly, the data signal controller 102 may receive an inbound data signal from a data signal source 108, as a guided data signal, via inbound transmission line(s) 112(1)-112(P). Inbound transmission line(s) 112(1)-112(P) may comprise coaxial cables, twisted pair cables (e.g., UTP and STP cables), fiber optic cables, or any suitable combination thereof.

The data signal controller 102 may be configured to selectively modulate, amplify, repeat, and/or convert an inbound data signal to generate an outbound data signal for transmission to the establishment 104 via legacy transmission line(s) 106(1)-106(N). The inbound data signal may comprise light signals carried via optical fiber cables, or RF signals (e.g., 2G, 3G, LTE, or 5G-NR signals) transported via coaxial, twin-lead, UTP, or STP cables, or AC power wiring.

In some embodiments, the data signal controller 102 may receive measurement data from a data signal translator 114 located within the establishment 104. Measurement data may include a quantitative measure of data signal strength at the establishment 104 and data usage associated with the user device(s) 116(1)-116(Q) operating within the establishment. In one embodiment, the data signal controller 102 may analyze the data usage associated with the user device(s) 116(1)-116(Q) to determine data signal requirements. Data signal requirements may include, without limitation, data signal type, data throughput, and data latency associated with an operation of the user device(s) 116(1)-116(Q).

In another embodiment, the data signal translator 114 may analyze data usage, at the establishment 104, to determine the data signal strength of an outbound data signal. The data signal translator 114 may communicate the data signal strength, as measurement data, to the data signal controller 102. The data signal controller 102 may use the measurement data to determine the degree of signal attenuation that occurs via transmission of the outbound data signal across the legacy transmission line(s) 106(1)-106(N).

In yet another embodiment, the data signal translator 114 may be configured to modulate, amplify, repeat, and/or convert an outbound data signal to a modified outbound data signal that is commensurate with the data signal requirements of the user device(s) 116(1)-116(Q) within the establishment 104.

The data signal controller 102 may interact with the data signal translator 114 via the legacy transmission line(s) 106(1)-106(N) or one or more network(s) 118. The one or more network(s) 118 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Moreover, the user device(s) 116(1)-116(Q) may include any suitable electronic device, such as a smart television, a multimedia streaming device, a cellular phone, a smartphone, a tablet computer, an electronic reader, a media player, a gaming device, a personal computer (PC), a laptop computer, etc. The user device(s) 116(1)-116(Q) may also include network devices that act as intermediaries with the Internet (e.g. a router). It is noteworthy that the Internet is accessible via one or more network(s) 118. In some examples, the user device(s) 116(1)-116(Q) may include a subscriber identity module (SIM), such as an eSIM, to identify each device to a telecommunication service provider (also referred to herein, as "telecommunications network").

The data signal controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices, such as the user device(s) 116(1)-116(Q) via the one or more network(s) 118.

Figure 2:
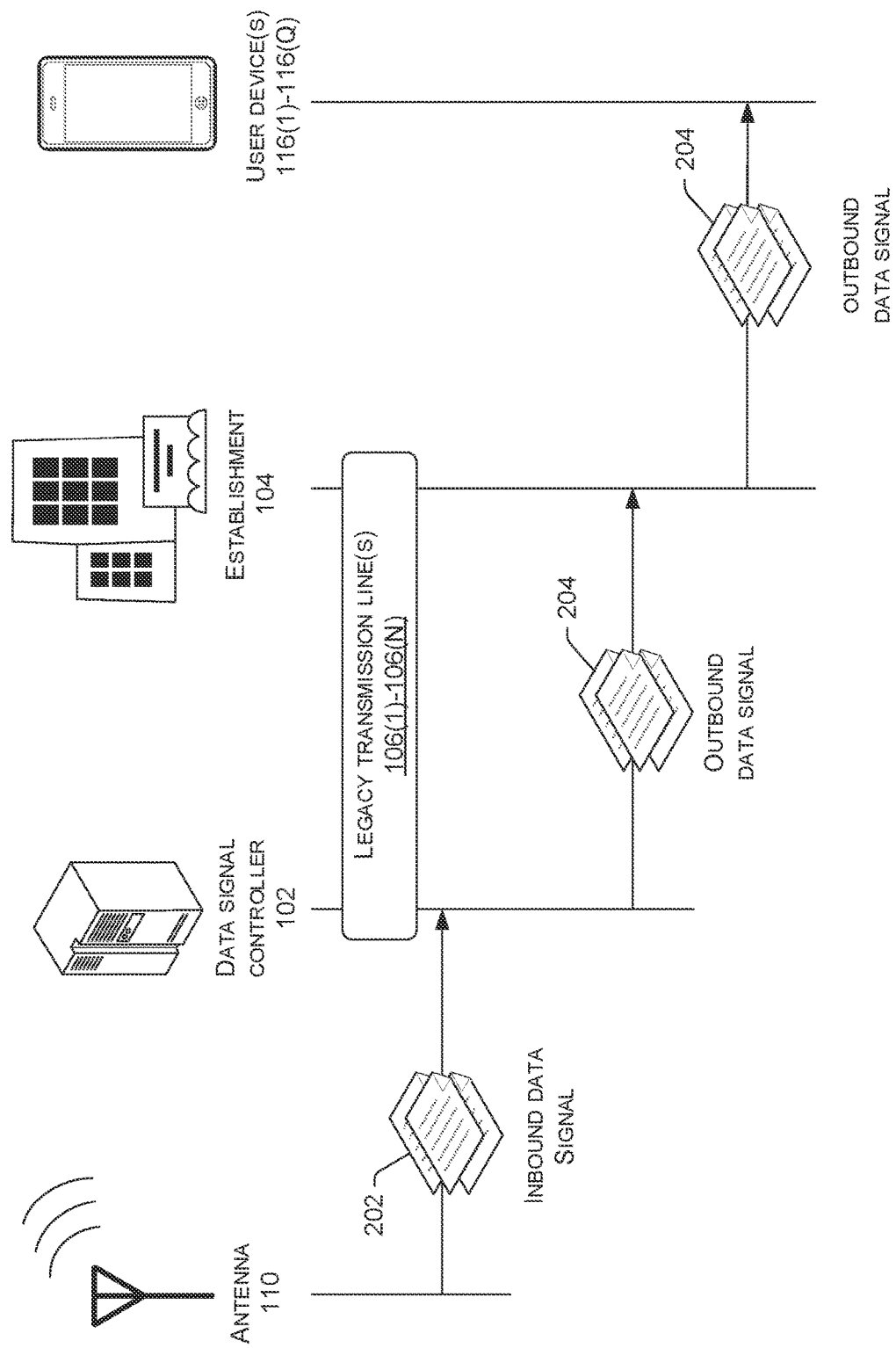
FIG. 2 illustrates a block diagram of an operation of the data signal controller in delivering a data signal to an establishment via legacy transmission line(s).

FIG. 2 illustrates a block diagram of an operation of the data signal controller in delivering a data signal to an establishment via legacy transmission line(s). The data signal controller 102 may be configured to receive an inbound data signal 202. The inbound data signal 202 may be an RF signal or a light signal. RF signals may include 2G, 3G, LTE, 5G-NR, or any suitable combination thereof. In the illustrated example, the data signal controller 102 may receive an inbound data signal 202 (e.g., inbound RF signal) via an antenna 110 that is configured to capture unguided RF signals propagating in free space. Alternatively, or additionally, the data signal controller 102 may receive the inbound data signal 202 (e.g., inbound RF signal or inbound light signal) via an inbound transmission line.

In the illustrated example, the data signal controller 102 may analyze the inbound data signal 202 to determine whether to modify the inbound data signal 202 to a different, outbound data signal 204 for transmission to the establishment 104 via legacy transmission line(s) 106(1)-106(N). Modification of the inbound data signal 202 may involve signal amplification, detection, modulation, or conversion (e.g., an RF to light signal, or vice versa). Analysis of the inbound data signal 202 may be based on one or more criteria, such as the data signal capability of legacy transmission line(s) 106(1)-106(N), namely data signal type (e.g., RF signal or light signal), data throughput, and data latency, the data signal strength of the inbound data signal 202, and the data signal requirements of the user device(s) 116(1)-116(Q) operating within the establishment 104.

Following an analysis of the inbound data signal 202, the data signal controller 102 may generate an outbound data signal 204 for transmission to the establishment 104 via the legacy transmission line(s) 106(1)-106(N). In one embodiment, the outbound data signal 204 may be the same as the inbound data signal 202. In another example, the outbound data signal 204 may be different from the inbound data signal 202. Upon receipt at the establishment 104, the outbound data signal 204 may be accessed via the user device(s) 116(1)-116(Q) operating within the establishment 104.

Figure 3:
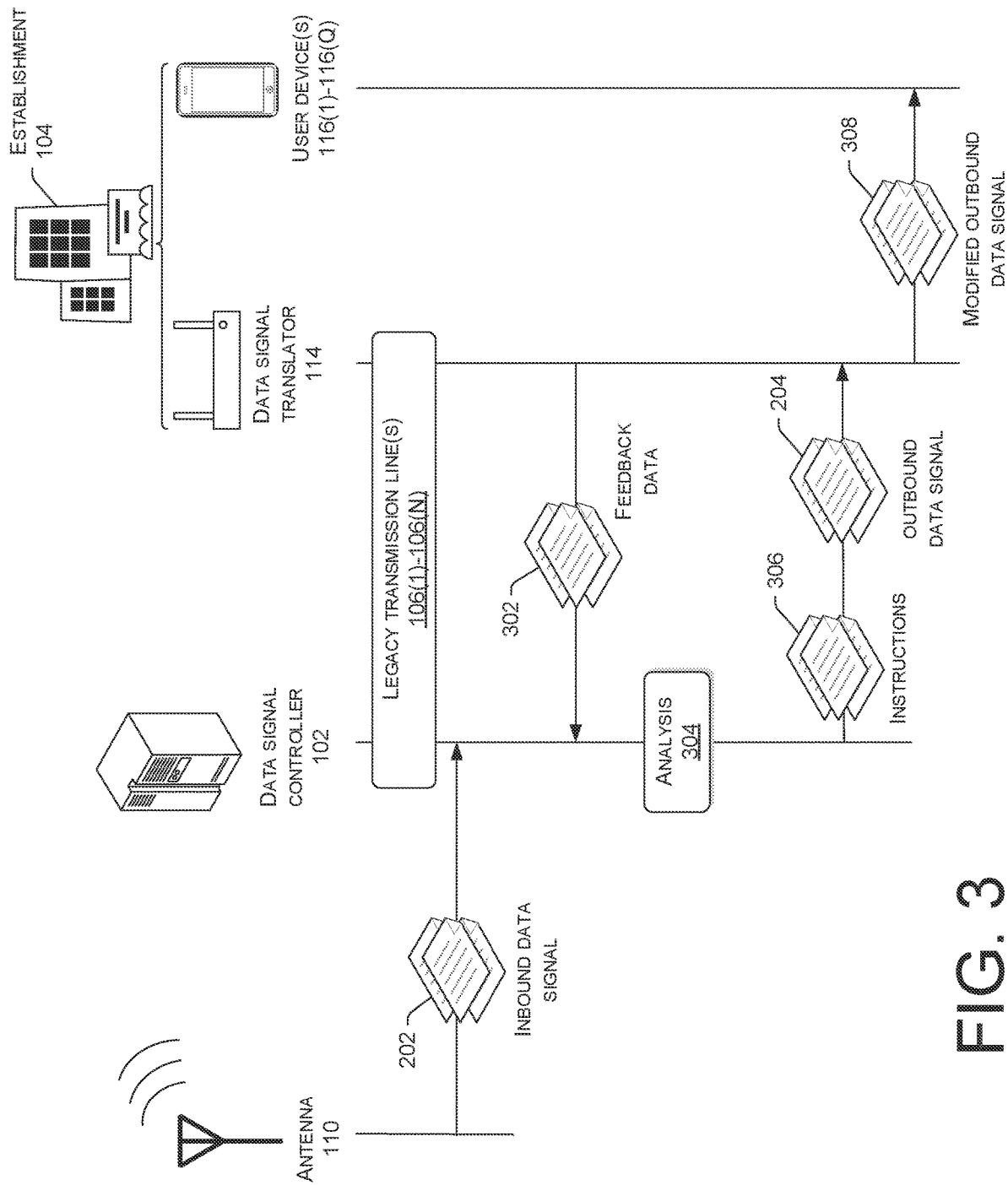
FIG. 3 illustrates a block diagram of an operation of the data signal controller interacting with a data signal translator within an establishment to deliver an outbound data signal.

FIG. 3 illustrates a block diagram of an operation of the data signal controller interacting with a data signal translator within an establishment to deliver an outbound data signal. The operation of delivering an outbound data signal 204 to the establishment 104 includes operations previously described with reference to FIG. 2, but for, the interaction with a data signal translator. As such, for brevity and ease of description, various details relating to the operation of delivering an outbound data signal 204 to the establishment 104 have been omitted herein to the extent that the same or similar details have been provided with reference to FIG. 2.

In the illustrated example, the data signal controller 102 may receive measurement data 302 from the data signal translator 114, located within the establishment 104. The data signal translator 114 may be configured to monitor user device(s) 116(1)-116(Q) operating within the establishment 104 to capture their data usage. The data signal translator 114 may monitor user device(s) 116(1)-116(Q) continuously, per a predetermined schedule, or in response to a triggering event. The predetermined schedule may be based on any time interval, such as one minute, ten minutes, 30 minutes, or one hour. The triggering event may comprise a data usage of a user device that is implemented via the outbound data signal. The data signal translator 114 may further measure the data signal strength of the outbound data signal 204 at the establishment 104.

Upon receipt of the measurement data 302, the data signal controller 102 may determine the degree of signal attenuation that occurs via transmission of the outbound data signal across the legacy transmission line(s). Also, based on the measurement data 302, the data signal controller 102 may determine the data signal requirements associated with the user devices. Data signal requirements may include without limitation, data signal type (e.g., RF signal or light signal), data throughput, data error rate, and data latency.

At 304, the data signal controller 102 may selectively amplify, modulate, or convert an inbound data signal 202 to a different, outbound data signal 204, based at least in part on the measurement data 302 (e.g., data signal attenuation and data signal requirements). The data signal controller 102 may further select a particular legacy transmission line of the legacy transmission line(s) 106(1)-106(N) to transmit the outbound data signal 204 to the establishment 104.

In one embodiment, the data signal controller 103 may select a particular legacy transmission line of the legacy transmission line(s) 106(1)-106(N) based on a comparison of the data signal capability of the legacy transmission line(s) 106(1)-106(N) with the data signal characteristics (e.g., data throughput, data latency, or a suitable combination thereof) of the outbound data signal 204. In other words, the selection of a particular legacy transmission line may be premised on the compatibility of the particular legacy transmission line in carrying a data signal type (e.g., RF signal or light signal) that corresponds to the outbound data signal 204 (e.g., RF signal or light signal), and the data signal capability of the particular legacy transmission line being greater than or equal to the data signal characteristics (e.g., data throughput, data latency, or a suitable combination thereof) of the outbound data signal 204. It is noteworthy that the data signal characteristics of the outbound data signal 204 are a direct function of the data signal requirements of the user device(s) 116(1)-116(Q) operating within the establishment 104.

In another embodiment, the data signal controller 102 may determine that the legacy transmission line(s) 106(1)-106(N) are unable to deliver an outbound data signal 204 that meets the data signal requirements of the user device(s)

116(1)-116(Q) operating within the establishment 104. In other words, legacy transmission line(s) 106(1)-106(N) may be incompatible with the data signal type of the outbound data signal 206, or the data signal capability of the legacy transmission line(s) 106(1)-106(N) may less than the data signal characteristics (e.g., data throughput, data latency, or a suitable combination thereof) of the outbound data signal 204. In this instance, the data signal controller 102 may generate computer-executable instructions (e.g., instructions 306) for delivery to the data signal translator 114 that cause the data signal translator 114 to amplify, repeat, detect, modulate, convert, or any suitable combination thereof, the outbound data signal 204 to a modified outbound data signal 308 that meets or exceeds the data signal requirements of the user device(s) 116(1)-116(Q) operating within the establishment 104.

Figure 4:
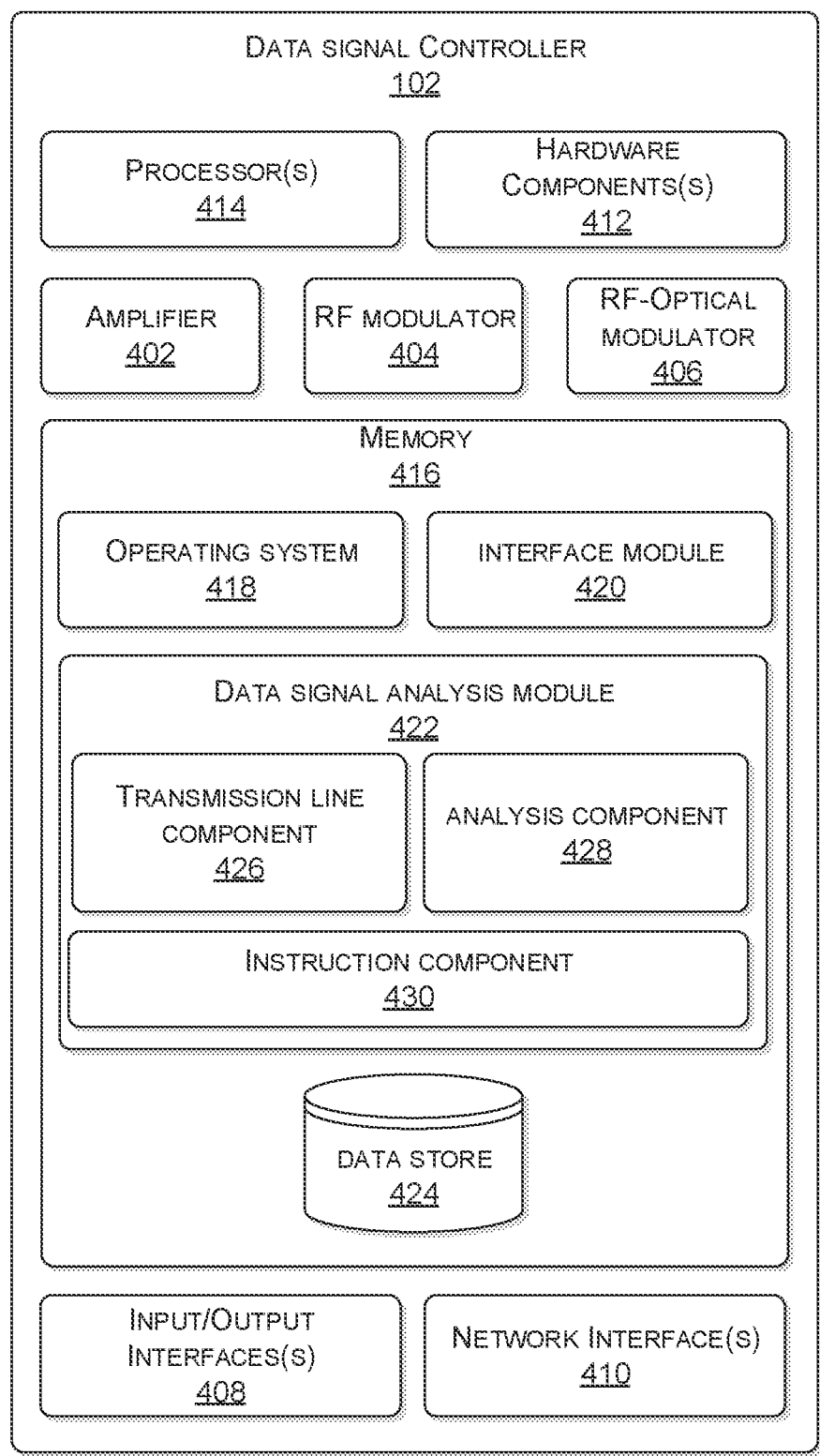
FIG. 4 illustrates various components of an example data signal controller.

FIG. 4 illustrates various components of an example data signal controller. The data signal controller 102 may be configured to receive an inbound data signal, selectively detect, modulate, amplify, repeat, and/or convert the inbound data signal to generate an outbound data signal for transmission to an establishment. The data signal controller 102 may modify (e.g., detect, modulate, amplify, repeat and/or convert) an inbound data signal based on the data signal transport capabilities of legacy transmission lines that connect the data signal controller 102 to an establishment. Additionally, or alternatively, the data signal controller 102 may modify an inbound data signal based on measurement data received from a data signal translator within the establishment.

In some embodiments, the data signal controller 102 may include an amplifier 402, an RF modulator 404, and an RF-optical modulator 406. The amplifier 402 may comprise a low noise amplifier that is configured to amplify the inbound RF signal. The data signal controller 102 may amplify, an inbound RF signal to account for signal attenuation that is anticipated across the legacy transmission lines.

The RF modulator 404 may be configured to alter an inbound RF signal to a different, outbound RF signal (e.g., detected and modulated RF signal to a different frequency band). In some embodiments, the inbound RF signal received at the data signal controller 102 may require transformation due to the data signal capability of legacy transmission lines. In these instances, the RF modulator 404 may alter the inboard RF signal.

The RF-optical modulator 406 may be configured to convert an RF signal to a light signal for transmission via fiber optic cable, and vice versa. In one embodiment, the data signal controller 102 may convert an inbound RF signal to an outbound light signal for transmission via a fiber optic cable (e.g., legacy transmission line). In another embodiment, the data signal controller 102 may convert an inbound light signal to an outbound RF signal for transmission via a coaxial, UTP, or STP cable (e.g., legacy transmission line).

The data signal controller 102 may include input/output interface(s) 408. The input/output interface(s) 408 may include any suitable types of output interface known in the art, such as a display (e.g., a liquid crystal display), speakers, a vibrating mechanism, or a tactile feedback mechanism. Input/output interface(s) 408 also includes ports for one or more peripheral devices, such as headphones, peripheral speakers, or a peripheral display. Further, the input/output interface(s) 408 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the data signal controller 102 may include network interface(s) 410. The network interface(s) 410 may include any suitable sort of transceiver known in the art. For example, the network interface(s) 410 may include a radio transceiver that performs the function of transmitting and receiving radio frequency communications via an antenna. Also, the network interface(s) 410 may include a wireless communication transceiver and a near-field antenna for communicating over unlicensed wireless Transmission Control/Internet Protocol (TCP/IP) networks, such as local wireless data networks and personal area networks (e.g., Bluetooth or near field communication (NFC) networks). Further, the network interface(s) 410 may include wired communication components, such as an Ethernet port or a Universal Serial Bus (USB). Hardware component(s) 412 may include additional hardware interface, data communication hardware, and data storage hardware.

Moreover, the network interface(s) 410 may include an inbound data signal interface and an outbound data signal interface. The inbound data signal interface may comprise an antenna that captures unguided RF signals that propagate in free space. Alternatively, or additionally, the inbound data signal interface may provide a communicative interface for an inbound transmission line to receive an inbound data signal (e.g., an inbound RF signal or an inbound light signal). The inbound transmission line may be a coaxial cable or a twisted pair cable that delivers guided RF signals, or a fiber optic cable that delivers light signals.

The outbound data signal interface may provide a communicative interface for legacy transmission line(s) that are configured to carry guided data signals from the data signal controller to an establishment. The legacy transmission lines may comprise coaxial cables, twisted pair cables, fiber optic cables, or any suitable combination thereof.

Further, the data signal controller 102 may include one or more processor(s) 414 that are operably connected to memory 416. In at least one example, the one or more processor(s) 414 may be a central processing unit(s) (CPU), graphics processing unit(s) (GPU), or both a CPU and GPU or any suitable sort of processing unit(s). Each of the one or more processor(s) 414 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 414 may also be responsible for executing all computer applications stored in the memory, which can be associated with common types of volatile (RAM) and/or non-volatile (ROM) memory.

In some examples, memory 416 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 416 may further include non-transitory computer-readable media, such as volatile and nonvolatile, removable and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any suitable non-transitory medium which can be used to store the desired information.

In the illustrated example, the memory 416 may include an operating system 418, an interface module 420, a data signal analysis module 422, and a data store 424. The operating system 418 may be any suitable operating system capable of managing computer hardware and software resources. The operating system 418 may include an interface layer that enables applications to interface with the input/output interface(s) 408 and the network interface(s) 410.

The interface module 420 may be configured to receive measurement data from a data signal translator located within the establishment. The measurement data may include data usage of user devices operating within the establishment and a quantitative measure of data signal strength at the establishment.

The interface module 420 may be further configured to deliver computer-executable instructions to a data signal translator that causes the data signal translator to detect, modulate, amplify, or convert an outbound data signal.

The data signal analysis module 422 may further include a transmission line component 426, an analysis component 428, and an instruction component 430. The transmission line component 426 may be configured to analyze the data signal capability of legacy transmission lines that interface with the data signal controller 102. Data signal capability may include data throughput, data latency, and data signal type (e.g., RF signal or light signal).

The analysis component 428 may be configured to determine whether to detect, modulate, amplify, or convert an inbound data signal to a different, outbound data signal, for delivery via legacy transmission lines. In one embodiment, the analysis component 428 may analyze the RF signal strength of an inbound RF signal. If the RF signal strength is less than a predetermined RF threshold, the analysis component 428 may determine that the inbound RF signal is to be amplified to an RF signal strength that is at least equal to or greater than the predetermined RF signal strength threshold. The predetermined RF signal threshold may be set by an operator of the data signal controller 102.

In another embodiment, the analysis component 428 may calculate an RF signal attenuation that is likely to occur via RF legacy transmission lines between the data signal controller 102 and the establishment. The anticipated RF signal attenuation may be based on the length, diameter, and type of legacy transmission line (e.g., coaxial cable, UTP cable, or STP cable). Further, if the signal attenuation is likely to cause the RF signal strength at the establishment to fall below a predetermined RF signal strength threshold, the analysis component 428 may determine that the inbound RF signal is to be amplified by a measure equivalent to the anticipated signal attenuation, such that the RF signal strength at the establishment is equal to or greater than the predetermined RF signal strength threshold.

In another embodiment, the analysis component 428 may determine to modulate an inbound RF signal based on the data signal transport capabilities of the legacy transmission lines. For example, if an inbound RF signal has a data rate of 100 Mbps and the legacy transmission line can support a data throughput of up to 10 Mbps (e.g., coaxial cables), the analysis component 428 may modulate the inbound RF signal to generate a different outbound RF signal with a data throughput of up to 10 Mbps.

In another embodiment, the analysis component 428 may determine to convert an inbound data signal based on the data signal type supported by the legacy transmission lines. For example, if an inbound data signal comprises an RF signal, and the legacy transmission line is a fiber optic cable, the analysis component 428 may determine to convert the inbound RF signal to a light signal. Similarly, if the inbound data signal comprises a light signal and the legacy transmission line is a coaxial, UTP, or STP cable, the analysis component 428 may determine to convert the inbound light signal to an RF signal.

In yet another embodiment, the analysis component 428 may determine to detect, modulate, amplify, or convert a data signal based on measurement data received from the data signal translator within the establishment. In one example, the measurement data may include data usage of user devices operating within the establishment. Here, the analysis component 428 may analyze the measurement data to determine data signal requirements of the user devices operating within the establishment. Data signal requirements include data signal type, data rate, data latency, or any suitable combination thereof.

The analysis component 428 may further determine whether to cause a data signal translator located within the establishment to further detect, modulate, amplify, or convert an outbound data signal once the outbound data signal is received at the establishment. In this example, the analysis component 428 may first analyze measurement data (e.g., data usage of user devices within the establishment) to determine data signal requirements for user devices within the establishment. In doing so, the analysis component 428 may further determine whether the legacy transmission lines can transport an outbound data signal that meets the data signal requirements. If the analysis component 428 determines that the legacy transmission lines cannot transport the required outbound data signal, the analysis component 428 may determine that the data signal translator within the establishment is to detect, modulate, amplify, repeat, or convert the outbound data signal once the outbound data signal is received at the establishment.

Moreover, the analysis component 428 may be configured to select a particular legacy transmission line from a plurality of legacy transmission lines to transport the outbound data signal to the establishment. Selection may be based on the compatibility of the particular legacy transmission line in carrying a data signal type (e.g., RF signal or light signal) that corresponds to the outbound data signal, and a comparison of the data signal capability of the particular legacy transmission line (e.g., data rate, data latency, or any suitable combination thereof) relative to the data signal requirements of user devices operating within the establishment.

The instruction component 430 may interact with the analysis component 428 to generate instructions for the amplifier 402, RF modulator 404, and/or RF-optical modulator 406, to respectively amplify repeat, detect, modulate, and/or convert an inbound data signal. The instruction component 430 may be further configured to generate computer-executable instructions for delivery to a data signal translator to amplify, repeat, detect, modulate, convert, or any suitable combination thereof, an outbound data signal.

The data store 424 may include a repository of one or more rules that govern predetermined RF signal strength thresholds, and any other suitable data pertinent to an operation of the data signal controller 102.

Figure 5:
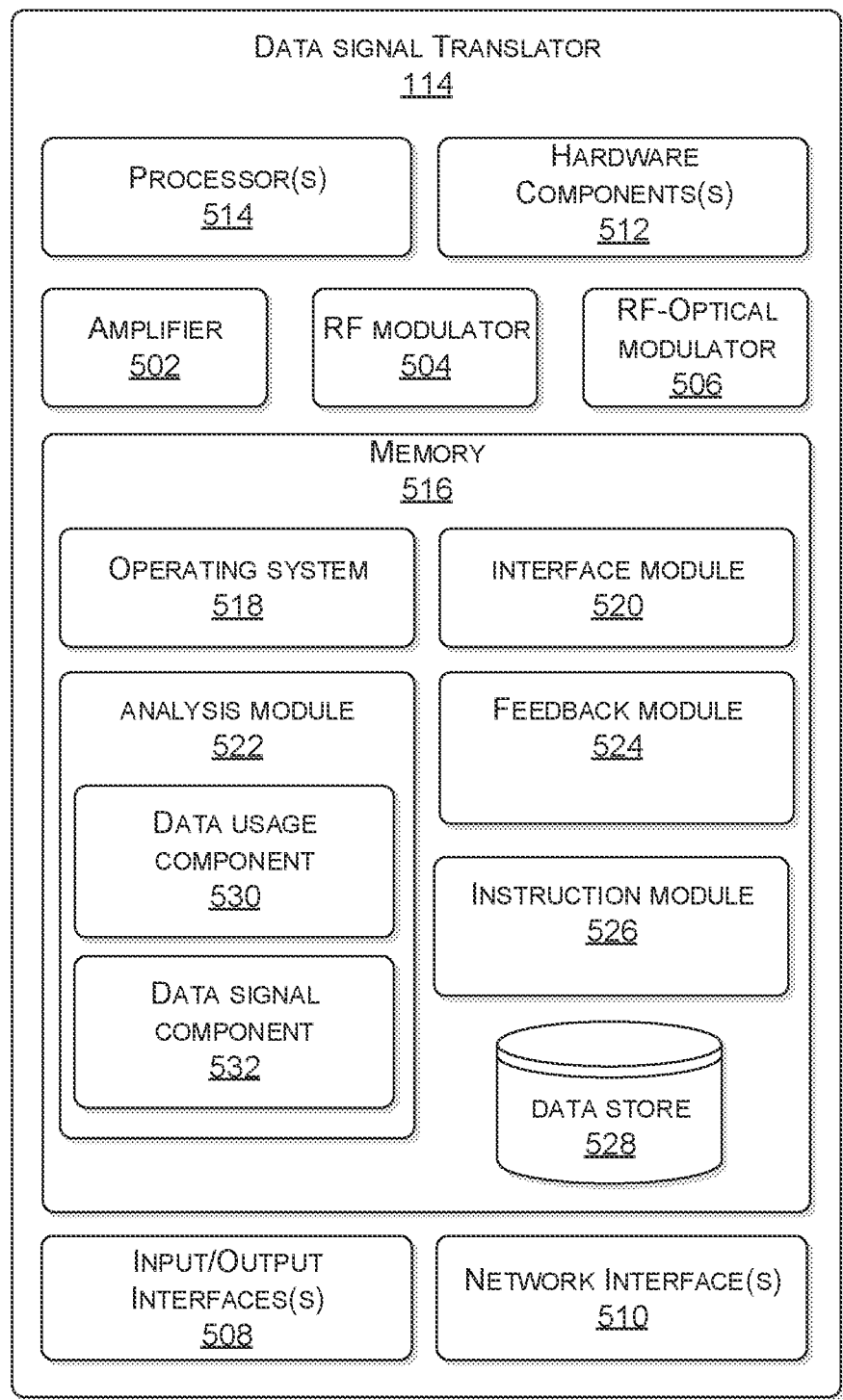
FIG. 5 illustrates various components of an example data signal translator.

FIG. 5 illustrates various components of an example data signal translator. The data signal translator 114 may be located within an establishment and may be configured to interact with a data signal controller 102 to generate an outbound data signal for user devices operating within the establishment. The data signal translator 114 may include an amplifier 502, detector, RF modulator 504, and an RF-optical modulator 506. The amplifier 502 may be functionally similar to the amplifier 402, the RF modulator 504 may be functionally similar to the RF modulator 404, and the RF-optical modulator 506 may be functionally similar to the RF-optical modulator 406.

The data signal translator 114 may include input/output interface(s) 508 and network interface(s) 510. The input/output interface(s) 508 may be functionally similar to input/output interface(s) 408, and the network interface(s) 510 may be similar to network interface(s) 410. Hardware component(s) 512 may functionally similar to hardware component(s) 412.

The data signal translator 114 may include one or more processor(s) 514 that are operably connected to memory 516. The one or more processor(s) 514 may be functionally similar to the one or more processor(s) 414, and the memory 516 may be similar to the memory 416.

The memory 516 may further include an operating system 518, an interface module 520, an analysis module 522, a measurement module 524, an instruction module 526, and a data store 528. The operating system 518 may include an interface lay that enables applications to interface with the input/output interface(s) 508 and the network interface(s) 510.

The interface module 520 may be configured to interact with a data signal controller 102 to receive measurement data associated with an outbound data signal. Further, the interface module 520 may receive the outbound data signal and computer-executable instructions from the data signal controller 102. The computer-executable instructions may be configured to cause the data signal translator to detect, modulate, amplify, or convert the outbound data signal.

The analysis module 522 may further comprise a data usage component 530 and a data signal component 532. The data usage component 530 may be configured to monitor with user devices operating within the establishment to capture their data usage. Data usage may comprise data throughput rates and types of data being consumed (e.g., streaming multimedia content, downloading data files, etc.). The data usage component 530 may monitor user devices continuously, per a predetermined schedule, or in response to a triggering event. The predetermined schedule may be based on any time interval, such as one minute, ten minutes, 30 minutes, or one hour. The triggering event may comprise a data usage of a user device that is implemented via the outbound data signal.

Data signal component 532 may be configured to monitor the data signal strength of the outbound data signal at the establishment. The data signal strength may be provided to the data signal controller to assist in determining the signal attenuation that occurs across the legacy transmission line(s). The data signal component 532 may monitor data signal strength continuously, per a predetermined schedule, or in response to a triggering event. The predetermined schedule may be based on any time interval, such as one minute, ten minutes, 30 minutes, or one hour. The triggering event may comprise a data usage of a user device, or receipt of an outbound data signal.

The measurement module 524 may interact with the data usage component 530 and the data signal component 532 to generate measurement data for delivery to the data signal controller. The measurement data may comprise the data usage of user devices operating within the establishment, and the data signal strength of an outbound data signal at the establishment.

The instruction module 526 may interact with the interface module 520 to generate instructions for the amplifier 502, RF modulator 504, and/or RF-optical modulator 506, to respectively amplify, detect, modulate, and/or convert an outbound data signal, based at least in part on computer-executable instructions received from the data signal controller 102.

The data store 528 may include a repository of measurement data, data usage, data signal strength, and any other suitable data pertinent to an operation of the data signal translator 114.

Figure 6:
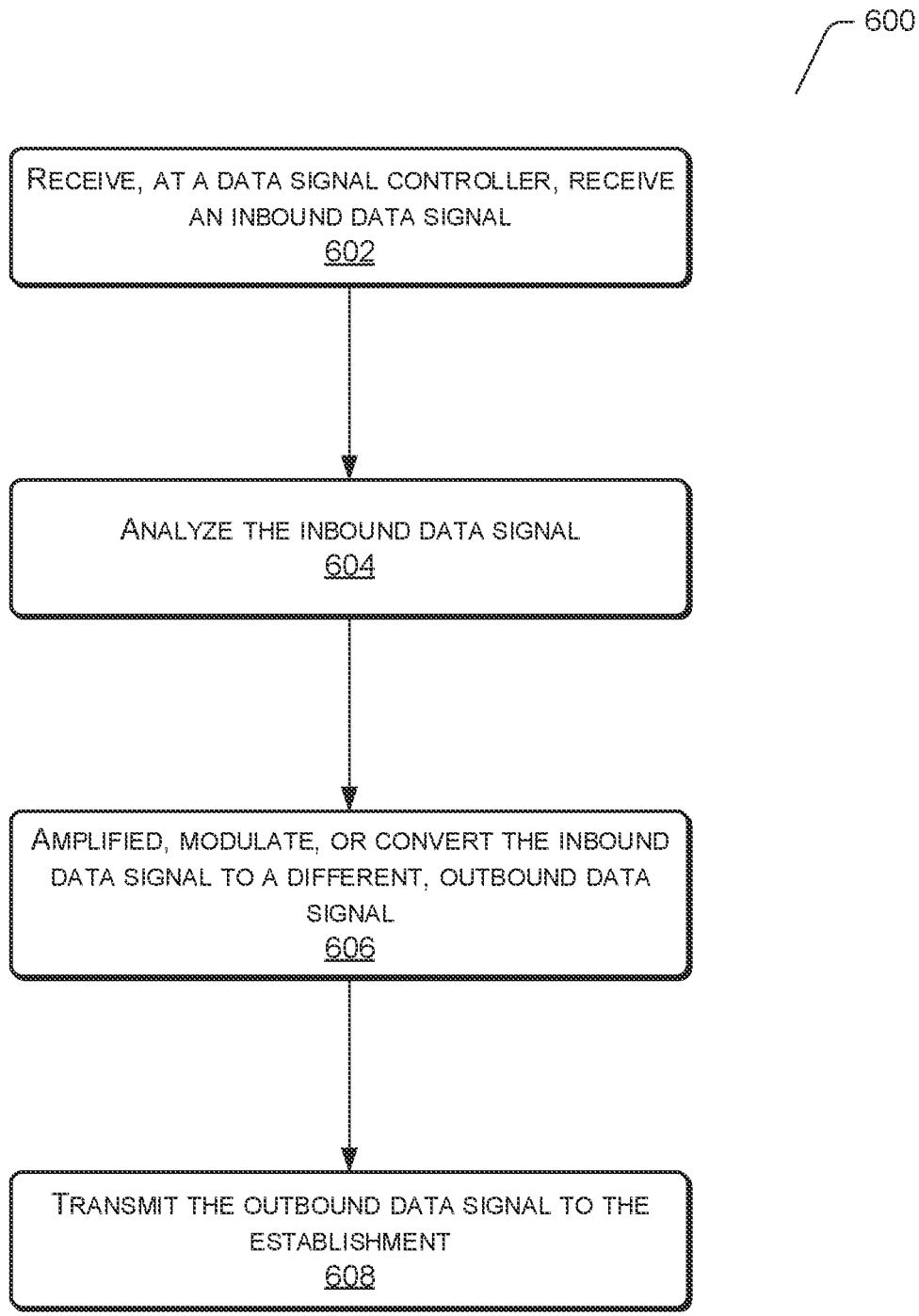
FIG. 6 illustrates an exemplary process for generating and transceiving an outbound data signal for delivery to an establishment via legacy transmission lines.
Figure 7:
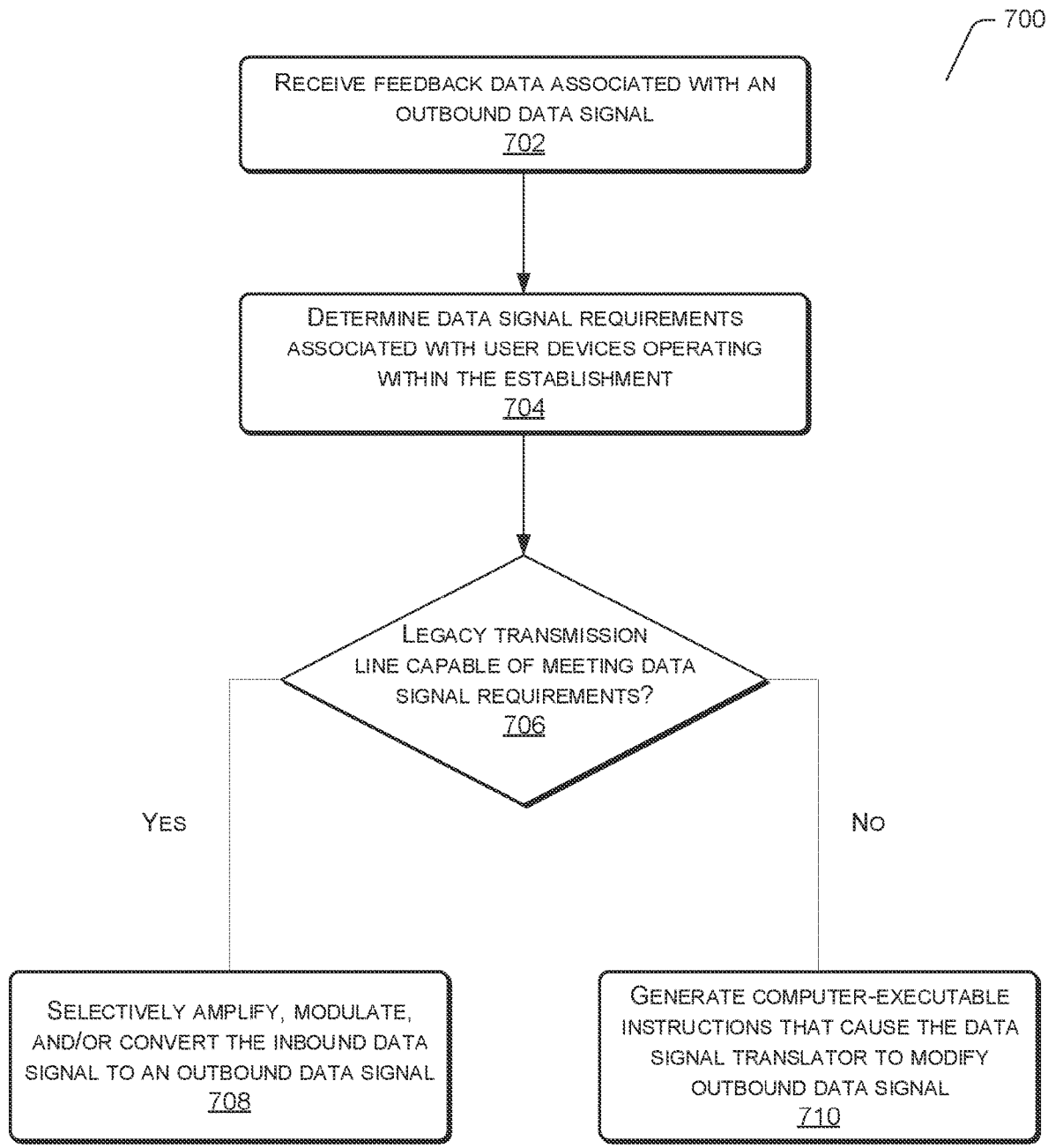
FIG. 7 illustrates an exemplary process for generating an outbound data signal based on measurement data from a data signal translator and further causing the data signal translator to modify the outbound data signal.

FIGS. 6 and 7 present processes 600 and 700 that relate to operations of the data signal controller 102. Each of processes 600 and 700 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, processes 600 and 700 are described with reference to the computing environment 100 of FIG. 1.

FIG. 6 illustrates an exemplary process for generating and transporting an outbound data signal for delivery to an establishment via legacy transmission lines. Process 500 is described from the perspective of the data signal controller that receives an inbound data signal and interfaces with the establishment via legacy transmission lines.

At 602, the data signal controller may receive an inbound data signal. The inbound data signal may comprise an RF signal or a light signal. The data signal controller may transceive the RF signal via an antenna that captures unguided RF signals propagating in free space, or via an inbound transmission line that delivers guided RF signals. Light signals may be transceived via an inbound fiber-optic cable.

At 604, the data signal controller may analyze the inbound data signal to determine whether to at least amplify, detect, modulate, or convert the inbound data signal to a different, outbound data signal. In one example, the data signal controller may amplify an inbound data signal to account for anticipated signal attenuation that is likely to occur via a legacy transmission line. In another example, the data signal controller may convert the inbound data signal to a different signal type (e.g., RF signal to a light signal, or vice versa). Conversion of the inbound data signal may be based on the data signal capability of the legacy transmission lines that communicatively connect the data signal controller to the establishment.

In some examples, the data signal controller may determine whether to amplify, detect, modulate, convert an inbound data signal based on measurement data received from a data signal translator within the establishment. The measurement data may include data signal strength of an outbound data signal within the establishment and data usage of user devices operating within the establishment.

At 606, the data signal controller may amplify, detect, modulate, or convert the inbound data signal to a different, outbound data signal. The data signal controller may amplify the inbound data signal via an amplifier, detect the inbound data signal via a detector, modulate the inbound data signal via an RF modulator, convert the inbound data signal via an RF-Optical modulator, or any suitable combination thereof.

At 608, the data signal controller may transmit the outbound data signal to the establishment for transport via a legacy transmission line. In some examples, the data signal controller may select a particular legacy transmission line from a plurality of legacy transmission lines based on the compatibility of the particular legacy transmission line in carrying a data signal type (e.g., RF signal or light signal) that corresponds to the outbound data signal, and a comparison of the data signal capability of the particular legacy transmission line (e.g., data throughput, data latency, or any suitable combination thereof) relative to the data signal requirements of user devices operating within the establishment.

FIG. 7 illustrates an exemplary process for generating an outbound data signal based on measurement data received from a data signal translator and further causing the data signal translator to modify the outbound data signal. In this example, the data signal controller may elect to cause the data signal translator to modify the outbound data signal because the legacy transmission lines that connect the data signal controller to the establishment are unable to deliver an outbound data signal that meets the data signal requirements of user devices operating within the establishment. Process 700 is described from the perspective of the data signal controller.

At 702, the data signal controller may receive measurement data associated with an outbound data signal from a data signal translator within the establishment. The measurement data may include data signal strength of an outbound data signal within the establishment and data usage of the user device(s) operating within the establishment.

At 704, the data signal controller may determine data signal requirements associated with user devices operating within the established, based at least in part on the measurement data. Data signal requirements may include without limitation, data signal type (e.g., RF signal or light signal), data throughput, and data latency.

At 706, the data signal controller may compare the data signal requirements of the user device(s) with the data signal transport capabilities of the legacy transmission lines. If the data signal controller determines that at least one legacy transmission line can transport an outbound data signal that meets the data signal requirements of the user devices, process 700 may proceed to 708. At 708, the data signal controller may selectively, generate and transmit an outbound data signal to the establishment via the legacy transmission line. Generating and transporting the outbound data signal is described in further detail with reference to process 600. In one example, the outbound data signal may be different from the inbound data signal. In another example, the outbound data signal may be the same as the inbound data signal.

Otherwise, if the data signal controller determines that the legacy transmission lines cannot transport an outbound data signal that meets that data signal requirements, process 700 may proceed to 710. At 710, the data signal controller may generate computer-executable instructions for delivery to the data signal translator that cause the data signal translator to amplify, repeat, detect, modulate, convert, or any suitable combination thereof, an outbound data signal to a modified outbound data signal that meets or exceeds the data signal requirements of the user devices operating within the establishment.

In some examples, the data signal controller may selectively amplify, repeat, detect, modulate, convert, or any suitable combination thereof, the inbound data signal to an outbound data signal that can be delivered to the establishment by the legacy transmission line. Alternatively, the data signal controller may transmit the inbound data signal, without modification, as the outbound data signal to the establishment via the legacy transmission lines. In these examples, the data signal translator is tasked with further amplifying, repeating, detecting, modulating, converting, or any suitable combination thereof, the outbound data signal to a modified outbound data signal that meets or exceeds the data signal requirements of the user devices operating within the establishment.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A data signal controller, comprising:
a first signal interface that is configured to receive a first data signal;
a second signal interface that is communicatively coupled to transmit a second data signal via a second RF interface or a second baseband interface;
one or more processors;
memory coupled to the one or more processors, the memory including one or more modules that are executable by the one or more processors to:
receive, at the first signal interface, the first data signal;
receive, from a data signal translator, measurement data associated with data usage of one or more user devices that are configured to at least receive the second data signal;
determine whether to process the first data signal to generate the second data signal based at least in part on the measurement data; and
generate the second data signal for delivery via the second signal interface, based at least in part on a determination to process the first data signal; and
generate additional computer-executable instructions for delivery to the data signal translator based at least in part on the measurement data, the additional computer-executable instructions to cause the data signal translator to modulate the second data signal to a third data signal.

2. The data signal controller of claim 1, wherein the first signal interface is configured to receive the first data signal as at least one of an unguided data signal propagating in free space or via a first RF transmission line that is communicatively coupled to the first signal interface.

3. The data signal controller of claim 1, wherein the second signal interface is communicatively coupled to a second transmission line, and
wherein the second signal interface is configured to transport the second data signal via the second transmission line, the second transmission line corresponding to one of an existing twisted pair cable, an existing electricity cable, an existing coaxial or twin-lead cable, or an existing fiber optic cable.

4. The data signal controller of claim 3, wherein the one or more modules are further executable by the one or more processors to:
   determine a data signal capability associated with the second transmission line, and
   wherein, to determine whether to process the first data signal is based at least in part on the data signal capability.

5. The data signal controller of claim 1, further comprising:
   a low noise amplifier, and
   wherein the one or more modules are further executable by the one or more processors to:
      analyze the first data signal to determine a data signal strength; and
      in response to the data signal strength being less than a predetermined data signal strength threshold, generate computer-executable instructions that cause the low noise amplifier to generate the second data signal by amplifying the first data signal to a second data signal strength that is greater than or equal to the predetermined data signal strength threshold.

6. The data signal controller of claim 1, wherein the first data signal corresponds to a first data signal type and the second data signal corresponds to a second data signal type is different from the first data signal type, and further comprising:
   a modulator, and
   wherein the one or more modules are further executable by the one or more processors to:
      in response to a determination to modulate the first data signal to generate the second data signal, generate computer-executable instructions that cause the modulator to modulate the first data signal to generate the second data signal.

7. The data signal controller of claim 1, wherein the one or more modules are further executable by the one or more processors to:
   identify a plurality of transmission lines that are communicatively connected to the second signal interface;
   determine individual transport capabilities for individual transmission lines of the plurality of transmission lines; and
   select a particular transmission line of the plurality of transmission lines for transport of the second data signal, based at least in part on the individual transport capabilities.

8. The data signal controller of claim 7, wherein selecting the particular transmission line is further based at least in part on a comparison of the individual transport capabilities of the transmission lines and data signal requirements of the one or more user devices.

9. The data signal controller of claim 7, wherein selecting the particular transmission line is further based at least in part on a comparison of the individual transport capabilities of the transmission lines with a second data signal type of the second data signal.

10. A computer-implemented method, comprising:
    under control of one or more processors:
    determining, at a first signal interface, a presence of a first data signal;
    receiving, from a data signal translator, measurement data associated with data usage of one or more user devices that are configured to at least receive a second data signal;
    determining whether to modulate the first data signal to generate the second data signal for delivery via a second RF or baseband interface based at least in part on the measurement data;
    in response to determining to modulate the first data signal, generating the second data signal for transmission via the second RF or baseband interface; and
    generating computer-executable instructions for delivery to the data signal translator based at least in part on the measurement data, the computer-executable instructions to cause the data signal translator to modulate the second data signal to a third data signal.

11. The computer-implemented method of claim 10, further comprising:
    retrieving, from a data store, one or more rules associated with modulating the first data signal, and
    wherein, determining whether to modulate the first data signal is based further in part on the one or more rules.

12. The computer-implemented method of claim 10, further comprising:
    determining a data signal capability of a second transmission line that is communicatively connected to the second RF or baseband interface, and
    wherein, determining whether to modulate the first data signal is based further in part on the data signal capability.

13. One or more non-transitory computer-readable media collectively storing computer-executable instructions that, when executed with one or more processors, collectively cause computers to perform acts comprising:
    determining, at a first signal interface, a presence of a first data signal having a first data signal type;
    receiving, from a data signal translator, measurement data associated with data usage of one or more user devices that are configured to receive at least a second data signal; and
    modulating the first data signal to generate the second data signal for transmission via a second signal interface based at least in part on the measurement data, the second data signal having a second data signal type; and
    generating computer-executable instructions for delivery to the data signal translator that cause the data signal translator to modulate the second data signal to generate a third data signal based at least in part on the measurement data.

14. The one or more non-transitory computer-readable media of claim 13, wherein the second data signal type corresponds to the first data signal type, and wherein the second data signal corresponds to an amplified instantiation of the first data signal.

15. The one or more non-transitory computer-readable media of claim 13, wherein the second data signal type is different from the first data signal type.

16. The one or more non-transitory computer-readable media of claim 13, wherein acts further comprise:
    determining a data signal capability of a transmission line that is communicatively connected to the second signal interface; and
    determining whether the second data signal conforms with the data signal capability, and wherein, generating the second data signal is based further in part on the second data signal conforming to the data signal capability.

17. The one or more non-transitory computer-readable media of claim 16, wherein the acts further comprise:
identifying a plurality of transmission lines that are communicatively connected to the second signal interface;
determining individual transport capabilities for individual transmission lines of the plurality of transmission lines; and
selecting a particular transmission line of the plurality of transmission lines for transport of the second data signal, based at least in part on the individual transport capabilities.

18. The one or more non-transitory computer-readable media of claim 17, wherein selecting the particular transmission line is further based at least in part on a comparison of the individual transport capabilities of the transmission lines and data signal requirements of the one or more user devices.

19. The one or more non-transitory computer-readable media of claim 17, wherein selecting the particular transmission line is further based at least in part on a comparison of the individual transport capabilities of the transmission lines with the second data signal type of the second data signal.

20. The one or more non-transitory computer-readable media of claim 13, wherein acts further comprise:
determining a data signal capability of a transmission line that is communicatively connected to the second signal interface;
determining that data signal requirements of the one or more user devices is greater than the data signal capability of the transmission line; and
determining a third data signal type that complies with the data signal requirements of the one or more user devices, the third data signal type being different from the second data signal type of the second data signal, wherein generating includes generating the computer-executable instructions for delivery to the data signal translator that cause the data signal translator to modulate the second data signal to generate the third data signal having the third data signal type.

* * * * *